US012763322B2

(12) United States Patent
Chae et al.

(10) Patent No.: US 12,763,322 B2
(45) Date of Patent: Oct. 13, 2026

(54) POSITIVE ACTIVE MATERIAL FOR RECHARGEABLE LITHIUM BATTERIES, PREPARATION METHOD THEREOF AND RECHARGEABLE LITHIUM BATTERIES INCLUDING THE SAME

(71) Applicant: SAMSUNG SDI CO., LTD., Yongin-si (KR)

(72) Inventors: Youngjoo Chae, Yongin-si (KR); Minhan Kim, Yongin-si (KR); Jinhwa Kim, Yongin-si (KR); Jihyun Seog, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 599 days.

(21) Appl. No.: 18/354,414

(22) Filed: Jul. 18, 2023

(65) Prior Publication Data

US 2024/0178373 A1 May 30, 2024

(30) Foreign Application Priority Data

Nov. 14, 2022 (KR) ........................ 10-2022-0151813

(51) Int. Cl.
*H01M 4/36* (2006.01)
*H01M 4/02* (2006.01)
(Continued)

(52) U.S. Cl.
CPC ......... *H01M 4/366* (2013.01); *H01M 4/0471* (2013.01); *H01M 4/525* (2013.01);
(Continued)

(58) Field of Classification Search
CPC ..................................................... H01M 4/366
See application file for complete search history.

(56) References Cited

U.S. PATENT DOCUMENTS

2014/0205898 A1 7/2014 Lee et al.
2019/0173076 A1* 6/2019 Kim ...................... H01M 4/525
(Continued)

FOREIGN PATENT DOCUMENTS

JP 2020-068210 A 4/2020
JP 2020-072092 A 5/2020
(Continued)

OTHER PUBLICATIONS

Office Action dated Jan. 24, 2025 of the corresponding Korean Patent Application No. 10-2022-0151813, 9pp.
(Continued)

*Primary Examiner* — Brian R Ohara
(74) *Attorney, Agent, or Firm* — Womble Bond Dickinson (US) LLP

(57) ABSTRACT

Disclosed are a positive active material for a rechargeable lithium battery, a preparation method thereof, and a rechargeable lithium battery including the same. The positive active material for a rechargeable lithium battery includes a first positive active material including a lithium nickel-based composite oxide and including a secondary particle in which a plurality of primary particles are aggregated and a cobalt coating portion on a surface of the secondary particle, and a second positive active material including a lithium nickel-based composite oxide and including a single particle and a cobalt coating portion on a surface of the single particle, wherein a cobalt content (at %) based on the total amount of nickel and cobalt in the cobalt coating portion of the first positive active material is about 1.45 times to about 1.60 times a cobalt content (at %).

8 Claims, 10 Drawing Sheets

(51) Int. Cl.

| | |
|---|---|
| ***H01M 4/04*** | (2006.01) |
| ***H01M 4/525*** | (2010.01) |
| ***H01M 10/052*** | (2010.01) |

(52) U.S. Cl.

CPC .... *H01M 10/052* (2013.01); *H01M 2004/021* (2013.01); *H01M 2004/028* (2013.01)

(56) References Cited

U.S. PATENT DOCUMENTS

| | | | | |
|---|---|---|---|---|
| 2020/0136126 | A1 | 4/2020 | Hong et al. | |
| 2021/0074998 | A1 | 3/2021 | Yun et al. | |
| 2021/0135214 | A1 | 5/2021 | Goto et al. | |
| 2022/0069289 | A1 | 3/2022 | Park et al. | |
| 2022/0077450 | A1 | 3/2022 | Jang et al. | |
| 2022/0263078 | A1 * | 8/2022 | Kang | H01M 4/366 |

FOREIGN PATENT DOCUMENTS

| | | | |
|---|---|---|---|
| JP | 2021-72193 | A | 5/2021 |
| JP | 2022-082508 | A | 6/2022 |
| KR | 10-2014-0093529 | A | 7/2014 |
| KR | 10-2022-0030027 | A | 3/2022 |
| KR | 10-2022-0116943 | A | 8/2022 |

OTHER PUBLICATIONS

Notice of Allowance dated Sep. 24, 2024, of the corresponding Japanese Patent Application No. 2023-120731, 3pp.

Bi, Yujing et al.; "Highly stable Ni-rich layered oxide cathode enabled by a thick protective layer with bio-tissue structure"; Energy Storage Materials; vol. 24; Aug. 9, 2019 (Aug. 9, 2019); pp. 291-296; XP093145494, ISSN: 2405-8297, DOI: 10.1016/j.ensm.2019.08.006.

Extended European Search Report dated Apr. 18, 2024, of the corresponding European Patent Application No. 23186251.7, 11pp.

Kaur, Gurbinder et al.; "Review-Surface Coatings for Cathodes in Lithium Ion Batteries: From Crystal Structures to Electrochemical Performance"; Journal of the Electrochemical Society; vol. 169; No. 4; Apr. 8, 2022 (Apr. 8, 2022); 32 pp.; XP093144841, ISSN:0013-4651, DOI: 10.1149/1945-7111/ac60f3.

Kim, Youngjin et al.; "Rational Design of Coating Ions via Advantageous Surface Reconstruction in High-Nickel Layered Oxide Cathodes for Lithium-Ion Batteries"; Advanced Energy Materials; vol. 11; No. 38; Aug. 26, 2021 (Aug. 26, 2021); XP093145409, DE, ISSN: 1614-6832, DOI: 10.1002/aenm.202101112.

Wei, Jian et al.; "Enhanced electrochemical performance of cobalt oxide layers coated $LiNi_{0.8}Co_{0.1}Mn_{0.1}O_2$ by polyvinylpyrrolidone-assisted method cathode for Li-ion batteries"; Journal of Colloid and Interface Science; vol. 616; Jun. 1, 2022 (Jun. 1, 2022); pp. 520-531; XP093129546, US, ISSN: 0021-9797, DOI: 10.1016/j.jcis.2022.02.095.

Yoon, Moonsu et al.; "Reactive boride infusion stabilizes Ni-rich cathodes for lithium-ion batteries"; Nature Energy; vol. 6; No. 4; Mar. 1, 2021 (Mar. 1, 2021); pp. 362-371; XP037431833, DOI: 10.1038/S41560-021-00782-0.

* cited by examiner

POSITIVE ACTIVE MATERIAL FOR RECHARGEABLE LITHIUM BATTERIES, PREPARATION METHOD THEREOF AND RECHARGEABLE LITHIUM BATTERIES INCLUDING THE SAME

CROSS-REFERENCE TO RELATED APPLICATION

This application claims priority to and the benefit of Korean Patent Application No. 10-2022-0151813 filed in the Korean Intellectual Property Office on Nov. 14, 2022, the entire contents of which are hereby incorporated by reference.

BACKGROUND

1. Field

A positive active material for rechargeable lithium batteries, a preparation method thereof, and rechargeable lithium batteries including the same are disclosed.

2. Description of the Related Art

A portable information device such as a cell phone, a laptop, smart phone, and the like and an electric vehicle have used a rechargeable lithium battery having high energy density and easy portability as a driving power source. Recently, research has been actively conducted to use a rechargeable lithium battery having high energy density as a driving power source and/or power storage power source for hybrid or electric vehicles.

Various positive active materials have been investigated to realize rechargeable lithium batteries for applications for the above-referenced uses. Among them, lithium nickel-based oxide, lithium nickel manganese cobalt composite oxide, lithium nickel cobalt aluminum composite oxide, and lithium cobalt oxide are mainly used as positive active materials. However, these positive active materials have structure collapses and/or cracks during and/or after repeated charges and discharges and thus problems of deteriorating a long-term cycle-life of a rechargeable lithium battery and increasing resistance result and, as a result, such rechargeable lithium batteries do not exhibit satisfactory capacity characteristics. Accordingly, development of a positive active material that provides long-term cycle-life characteristics and realizes high capacity and high energy density is required or desired.

SUMMARY

Provided are a positive active material for a rechargeable lithium battery, a preparation method thereof, and a rechargeable lithium battery including the same. The positive active material realizes high capacity and high energy density, enhances stability of the positive active material, reduces surface side reactions, improves long-term cycle-life characteristics at high temperatures and initial charge and discharge efficiency, and reduces gas generation during high-temperature storage.

In an embodiment, a positive active material for a rechargeable lithium battery includes a first positive active material including a lithium nickel-based composite oxide and including a secondary particle in which a plurality of primary particles are aggregated and a cobalt coating portion on a surface of the secondary particle and a second positive active material including a lithium nickel-based composite oxide and including a single particle and a cobalt coating portion on a surface of the single particle, wherein a cobalt content (e.g., amount, at %) based on the total amount of nickel and cobalt in the cobalt coating portion of the first positive active material is about 1.45 times to about 1.60 times a cobalt content (e.g., amount, at %) based on the total amount of nickel and cobalt in the cobalt coating portion of the second positive active material.

In another embodiment, a method for preparing a positive active material for a rechargeable lithium battery includes performing a first process of adding a second lithium nickel-based composite oxide in a form of a single particle and a cobalt raw material to a solvent, sequentially performing a second process of adding a first lithium nickel-based composite oxide in a form of a secondary particle in which a plurality of primary particles are aggregated and a cobalt raw material, and obtaining a first positive active material having a cobalt coating portion on a surface of the secondary particle and a second positive active material having a cobalt coating portion on a surface of the single particle, wherein a ratio of the time (minutes) required for the first process to the time (minutes) required for the second process is about 65:35 to about 75:25.

In another embodiment, a rechargeable lithium battery includes a positive electrode including the positive active material, a negative electrode, and an electrolyte.

The positive active material for a rechargeable lithium battery prepared according to an embodiment realizes high capacity and high energy density of a rechargeable lithium battery, enhances stability, reduces surface side reactions, suppresses or reduces gas generation during high-temperature storage, and improves initial charge/discharge efficiency and long-term cycle-life characteristics at high temperatures.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1:
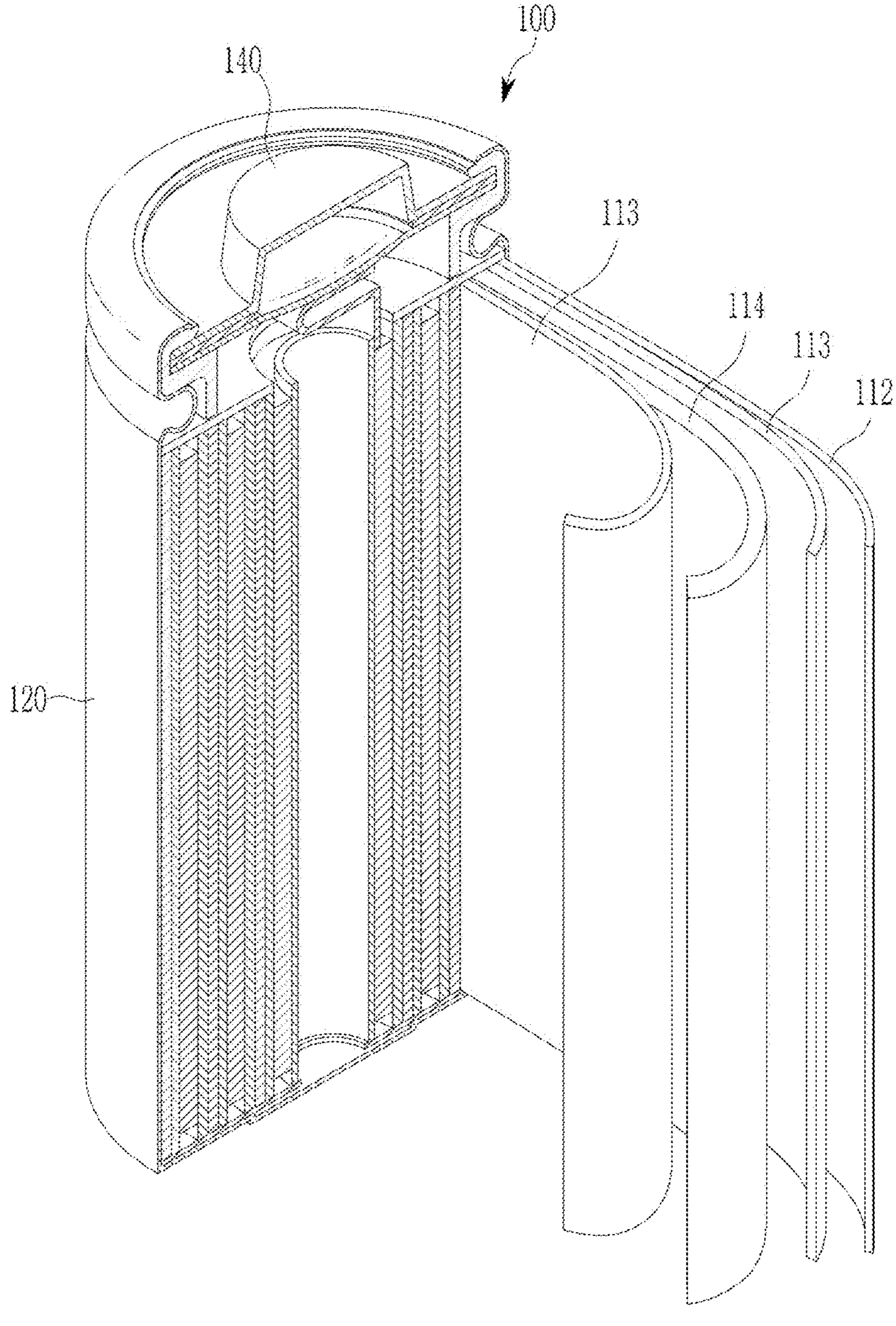
FIG. 1 is a schematic view illustrating a rechargeable lithium battery according to an embodiment.

Hereinafter, example embodiments of the present disclosure will be described in more detail so that those of ordinary skill in the art can easily implement them. However, the subject matter of this disclosure may be embodied in many different forms and should not be construed as limited to the example embodiments set forth herein.

The terminology used herein is used to describe embodiments only, and is not intended to limit the present disclosure. The singular expression includes the plural expression unless the context clearly dictates otherwise.

As used herein, "combination thereof" means a mixture, laminate, composite, copolymer, alloy, blend, reaction product, and the like of the constituents.

Herein, it should be understood that terms such as "comprises," "includes," or "have" are intended to designate the presence of an embodied feature, number, step, element, or a combination thereof, but it does not preclude the possibility of the presence or addition of one or more other features, number, step, element, or a combination thereof.

In the drawings, the thickness of layers, films, panels, regions, etc., may be exaggerated for clarity and like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In addition, the term "layer" as used herein includes not only a shape formed on the whole surface when viewed from a plan view, but also a shape formed on a partial surface (e.g., on a portion of a surface).

In addition, the average particle diameter may be measured by any suitable method generally used in the art, for example, may be measured by a particle size analyzer, and/or may be measured by a transmission electron micrograph and/or a scanning electron micrograph. In some embodiments, it is possible to obtain an average particle diameter value by measuring using a dynamic light scattering method, performing data analysis, counting the number of particles for each particle size range, and calculating from this. Unless otherwise defined, the average particle diameter may mean the diameter (D50) of particles having a cumulative volume of 50 volume % in the particle size distribution.

Herein, the term "or" is not to be construed as an exclusive meaning, for example, "A or B" is construed to include A, B, A+B, and the like.

As used herein, the term "Metal" is interpreted as a concept including ordinary metals, transition metals and metalloids (semi-metals).

Positive Active Material

In an embodiment, a positive active material for a rechargeable lithium battery includes a first positive active material including a lithium nickel-based composite oxide and including a secondary particle in which a plurality of primary particles are aggregated and a cobalt coating portion on a surface of the secondary particle, and a second positive active material including a lithium nickel-based composite oxide and including a single particle and a cobalt coating portion on a surface of the single particle. A cobalt content (e.g., amount, at %) based on a total amount of nickel and cobalt in the cobalt coating portion of the first positive active material is about 1.45 times to about 1.60 times a cobalt content (e.g., amount, at %) based on the total amount of nickel and cobalt in the cobalt coating portion of the second positive active material.

In order to increase energy density and improve initial efficiency and long-term cycle-life characteristics, a technique of using a mixture of a secondary particle-type positive active material and a single particle-type positive active material has been suggested. In addition, in order to increase structural stability of the positive active material but suppress or reduce a side reaction on a surface thereof, a technique of coating a material such as cobalt and/or the like on the positive active material is being used. When a positive active material having a high nickel content (e.g., amount) is synthesized in order to realize high capacity, because cation mixing occurs, and an unreacted lithium compound remains on the surface thereof, a washing process in general proceeds after the synthesis, and a technique of concurrently (e.g., simultaneously) using a coating process of a compound such as cobalt and/or the like together with the washing process is being used. In previous systems, when secondary particles and single particles are concurrently (e.g., simultaneously) coated, a coating material reacts more with the single particles having a relatively higher specific surface area and is more coated thereon, causing coating imbalance between secondary particles and single particles. For example, the coating material reacts more with the single particles than it does with the secondary particles, thereby resulting in a greater coating amount on the primary particles than on the secondary particles. As a result, the secondary particles do not obtain a suitable or sufficient coating effect, thereby causing structural collapse and/or side reactions on the surface to accelerate degradation, and coating particles are non-uniformly present on the surface, thereby causing gas generation (or excess gas generation). In the single particles, excessive coating acts as resistance (e.g., increases electrical resistance), which adversely affects battery performance.

In an embodiment, the performance of the rechargeable lithium battery, such as high-temperature long-term cycle-life characteristics, is improved by reinforcing or increasing the coating of the secondary particles while suppressing or reducing excessive coating on single particles, for example, by suitably or appropriately adjusting a relationship between the coating contents (e.g., coating amounts) of the two types or kinds of particles (e.g., the single particle and the secondary particle). According to an embodiment, when the cobalt coating content (e.g., cobalt coating amount) of the first positive active material in the form of the secondary particle satisfies a ratio of about 1.45 times to about 1.60 times that of the second positive active material in the form of the single particle, it is possible to improve high-temperature long-term cycle-life characteristics, suppress or reduce gas generation during high-temperature storage, and improve initial charge and discharge efficiency while realizing high capacity and high energy density. For example, according to embodiments of the present disclosure, the positive active material in the form of the secondary particle may a cobalt coating amount that is about 1.45 times to about 1.60 times that of the second positive active material in the form of the single particle.

The cobalt content (e.g., amount, at %) based on the total amount of nickel and cobalt in the cobalt coating portion of the first positive active material may be about 1.45 times to about 1.60 times, for example about 1.45 times to about 1.55 times, or about 1.50 times to about 1.60 times the cobalt content (e.g., amount, at %) based on the total amount of nickel and cobalt in the cobalt coating portion of the second positive active material.

First Positive Active Material

The first positive active material is in a polycrystal form and includes secondary particles in which at least two or more primary particles are aggregated.

The first positive active material according to an embodiment includes a cobalt coating portion on a surface of the secondary particle. The cobalt coating portion may be disposed on the entire or at least portion of the surface of the secondary particle. Because the first positive active material is coated with cobalt, structural collapse caused by repeated charging and discharging is effectively suppressed or reduced, and cycle-life characteristics at room temperature and high temperature may be improved.

The cobalt coating portion includes a cobalt-containing compound. The cobalt-containing compound may be, for example, cobalt oxide, cobalt hydroxide, cobalt carbonate, a compound thereof, or a mixture thereof. In addition, the cobalt-containing compound may further include other metal and/or non-metal elements in addition to cobalt. For example, the cobalt-containing compound may further include lithium, manganese, and/or nickel. For example, the cobalt-containing compound may be lithium cobalt oxide.

The cobalt content (e.g., amount) based on the total amount of nickel and cobalt in the cobalt coating portion of the first positive active material may be about 55 at % to about 70 at %, for example, about 55 at % to about 68 at %, about 55 at % to about 65 at %, about 55 at % to about 63 at %, about 57 at % to about 70 at %, about 59 at % to about 70 at %, about 60 at % to about 70 at %, about 60 at % to about 65 at %, or about 61 at % to about 63 at %. When the cobalt coating content (e.g., cobalt coating amount) of the first positive active material satisfies the above range and is about 1.45 times to about 1.60 times the cobalt coating content (e.g., cobalt coating amount) of the second positive active material, non-uniform coating between particles is eliminated, and a uniform coating is formed on the surface of the first positive active material to suppress or reduce gas generation and to improve initial charge/discharge efficiency and long-term cycle-life characteristics.

The first positive active material according to an embodiment may further include a grain boundary cobalt coating portion on the surface of the primary particles inside the secondary particles. The grain boundary cobalt coating portion exists inside the secondary particle, not on the surface, and may be said to be coated along the interface of the primary particles inside the secondary particle, and thus may be expressed as being coated on the grain boundary. Herein, the inside of the secondary particle means the entire inside except for the surface, and for example, it may mean the entire inside from a depth of about 10 nm from the outer surface, or a region from a depth of about 10 nm to a depth of about 2 μm. The first positive active material according to an embodiment further includes a grain boundary cobalt coating portion, thereby enhancing structural stability, inducing a uniform (e.g., substantially uniform) and even coating on the surface, and properly adjusting the coating content (e.g., amount) on the surface to obtain initial charge/discharge efficiency and cycle-life characteristics without increasing resistance.

An average particle diameter of the first positive active material, that is, an average particle diameter of the secondary particles may be about 5 μm to about 25 μm. For example, it may be about 7 μm to about 25 μm, about 10 μm to about 25 μm, about 15 μm to about 25 μm, or about 10 μm to about 20 μm. The average particle diameter of the secondary particles of the first positive active material may be greater than the average particle diameter of the second positive active material of single particles, which will be further described herein below. The positive active material according to an embodiment may be a mixture of a first positive active material that is polycrystalline and large particles and a second positive active material that is single and small particles, thereby improving the mixture density and implementing high capacity and high energy density. Herein, the average particle diameter of the first positive active material may be obtained by measuring the particle diameter of about 30 active materials in the form of the secondary particle randomly in an electron microscope photograph (or image) of the positive active material, and taking the diameter (D50) of the particle having a cumulative volume of 50 volume % in the particle size distribution as the average particle diameter.

The first positive active material is a nickel-based positive active material and includes a lithium nickel-based composite oxide. For example, the first positive active material may be a high-nickel-based positive active material having a high nickel content (e.g., a high nickel concentration or amount). In this case, the nickel content in the lithium nickel-based composite oxide may be greater than or equal to about 80 mol %, for example, greater than or equal to about 85 mol %, greater than or equal to about 90 mol %, or greater than or equal to about 91 mol %, and less than or equal to about 99.9 mol %, or less than or equal to about 99 mol % based on the total amount of elements other than lithium and oxygen. Such a high-nickel-based first positive active material may realize high capacity and high performance.

Second Positive Active Material

The second positive active material is in the form of a single particle, exists alone without a grain boundary within the particle, is composed of one particle, and has a monolith structure, a one body structure, or a non-aggregated particle, in which particles are not aggregated with each other but exist as an independent phase in terms of morphology, and may be expressed as a single particle (one body particle, single grain, or sole grain), for example, as a single crystal. The positive active material according to an embodiment may exhibit improved cycle-life characteristics while realizing high capacity and high energy density by including the second positive active material in the form of a single particle. For example, while the second positive active material may include a plurality of single particles, each single particle is a distinct particle as described above.

The second positive active material according to an embodiment includes a cobalt coating portion on the surface of a single particle. Since the second positive active material is coated with cobalt, structural collapse caused by repeated charging and discharging is effectively suppressed or reduced, and cycle-life characteristics at room temperature and high temperature may be improved.

The cobalt coating portion includes a cobalt-containing compound. The cobalt-containing compound may be, for example, cobalt oxide, cobalt hydroxide, cobalt carbonate, a compound thereof, or a mixture thereof. In addition, the cobalt-containing compound may further include other metal and/or non-metal elements in addition to cobalt. For example, the cobalt-containing compound may further include lithium, manganese, and/or nickel. For example, the cobalt-containing compound may be lithium cobalt oxide.

The cobalt content (e.g., amount) based on the total amount of nickel and cobalt in the cobalt coating portion of the second positive active material may be about 39 at % to about 45 at %, for example, about 39 at % to about 44 at %, about 39 at % to about 43 at %, about 39 at % to about 42 at %, about 40 at % to about 45 at %, or about 41 at % to about 45 at %. When the cobalt coating content (e.g., cobalt coating amount) of the second positive active material satisfies the above range and the ratio of the cobalt coating content (e.g., cobalt coating amount) of the first positive active material to the cobalt coating content (cobalt coating amount) of the second positive active material satisfies about 1.45 to about 1.60, non-uniform coating between particles is eliminated or reduced, excessive coating of the second positive active material is suppressed or reduced, and uniform (e.g., substantially uniform) coating is induced, thereby reducing resistance and improving initial charge/discharge efficiency and long-term cycle-life characteristics.

On the other hand, in an embodiment, a method for measuring the cobalt content (e.g., amount) relative to the total amount of nickel and cobalt on the surface of the positive active material may include performing scanning electron microscope-energy dispersive X-ray spectroscopy (SEM-EDS) on the surface of the positive active material, obtaining respective contents (e.g., amounts) of nickel and cobalt through quantitative analysis, and then calculating a ratio of the cobalt contents (e.g., amounts) to the sum. In addition to SEM-EDS, methods for measuring cobalt content (e.g., amount) may include Inductively Coupled Plasma-Mass Spectrometry (ICP-MS), Inductively Coupled Plasma Optical Emission Spectroscopy (ICP-OES), etc.

An average particle diameter of the second positive active material, that is, the average particle diameter of a single particle may be about 0.1 μm to about 10 μm, for example, about 0.1 μm to about 7 μm, about 0.5 μm to about 6 μm, or about 1 μm to about 5 μm. The particle diameter of the second positive active material may be smaller than that of the first positive active material, and thus, the density of the positive active material may be further increased. Herein, the average particle diameter of the second positive active material may be obtained by measuring the particle diameter of about 30 active materials in the form of the single particle randomly in an electron microscope photograph (or image) of the positive active material, and taking the diameter (D50) of the particle having a cumulative volume of 50 volume % in the particle size distribution as the average particle diameter.

The second positive active material includes a lithium nickel-based composite oxide as a nickel-based active material. For example, the second positive active material may be a high nickel-based positive active material having a high nickel content (e.g., a high nickel concentration or amount). In this case, the nickel content in the lithium nickel-based composite oxide may be greater than or equal to about 80 mol %, for example, greater than or equal to about 85 mol %, greater than or equal to about 90 mol %, or greater than or equal to about 91 mol % and less than or equal to about 99.9 mol %, or less than or equal to about 99 mol % based on the total amount of elements other than lithium and oxygen. Such a high-nickel-based second positive active material may realize high capacity and high performance.

In some embodiments, the first positive active material and the second positive active material may each independently include a lithium nickel-based composite oxide represented by Chemical Formula 1.

$$Li_{a1}Ni_{x1}M^1_{y1}M^2_{z1}O_{2-b1}X_{b1} \quad \text{Chemical Formula 1}$$

In Chemical Formula 1, $0.9 \le a1 \le 1.8$, $0.8 \le x1 \le 1$, $0 \le y1 \le 0.2$, $0 \le z1 \le 0.2$, $0.9 \le x1+y1+z1 \le 1.1$, $0 \le b1 \le 0.1$, $M^1$ and $M^2$ may each independently be at least one element selected from Al, B, Ba, Ca, Ce, Co, Cr, Cu, Fe, Mg, Mn, Mo, Nb, Si, Sr, Ti, V, W, and Zr, and X is at least one element selected from F, P, and S.

In Chemical Formula 1, $0.85 \le x1 \le 1$, $0 \le y1 \le 0.15$, and $0 \le z1 \le 0.15$, or $0.9 \le x1 \le 1$, $0 \le y1 \le 0.1$, and $0 \le z1 \le 0.1$.

For example, the first positive active material and the second positive active material may each independently include a lithium nickel-based composite oxide represented by Chemical Formula 2. The compound represented by Chemical Formula 2 may be referred to as a lithium nickel cobalt-based composite oxide.

$$Li_{a2}Ni_{x2}Co_{y2}M^3_{z2}O_{2-b2}X_{b2} \quad \text{Chemical Formula 2}$$

In Chemical Formula 2, $0.9 \le a2 \le 1.8$, $0.8 \le x2 < 1$, $0 < y2 \le 0.2$, $0 \le z2 \le 0.2$, $0.9 \le x2+y2+z2 \le 1.1$, $0 \le b2 \le 0.1$, $M^3$ may be at least one element selected from Al, B, Ba, Ca, Ce, Cr, Cu, Fe, Mg, Mn, Mo, Nb, Si, Sr, Ti, V, W, and Zr, and X may be at least one element selected from F, P, and S.

In Chemical Formula 2 $0.85 \le x2 \le 0.99$, $0.01 \le y2 \le 0.15$, and $0.012 \le z2 \le 0.15$, or $0.92 \le x2 \le 0.99$, $0.0 \le y2 \le 0.1$, and $0.012 \le z2 \le 0.1$.

For example, the first positive active material and the second positive active material may each independently include a lithium nickel-based composite oxide represented by Chemical Formula 3. The compound represented by Chemical Formula 3 may be referred to as lithium nickel-cobalt-aluminum oxide or lithium nickel-cobalt-manganese oxide.

$$Li_{a3}Ni_{x3}Co_{y3}M^4_{z3}M^5_{w3}O_{2-b3}X_{b3} \quad \text{Chemical Formula 3}$$

In Chemical Formula 3, $0.9 \le a3 \le 1.8$, $0.8 \le x3 \le 0.98$, $0.01 \le y3 \le 0.19$, $0.01 \le z3 \le 0.19$, $0 \le w3 \le 0.19$, $0.9 \le x3+y3+z3+w3 \le 1.1$, $0 \le b3 \le 0.1$, $M^4$ may be at least one element selected from Al and Mn, $M^5$ may be at least one element selected from B, Ba, Ca, Ce, Cr, Cu, Fe, Mg, Mo, Nb, Si, Sr, Ti, V, W, and Zr, and X may be at least one element selected from F, P, and S.

In Chemical Formula 3 $0.85 \le x3 \le 0.98$, $0.01 \le y3 \le .14$, $0.01 \le z3 \le 0.14$, and $0 \le w3 \le 0.14$, or $0.93 \le x3 \le 0.98$, $0.01 \le y3 \le 0.09$, $0.01 \le z3 \le 0.09$, and $0 \le w3 \le 0.09$.

For example, the first positive active material and the second positive active material may each independently include a lithium nickel-based composite oxide represented by Chemical Formula 4. The compound of Chemical Formula 4 may be referred to as a cobalt-free lithium nickel-manganese-based oxide.

$$Li_{a4}Ni_{x4}Mn_{y4}M^6_{z4}O_{2-b4}X_{b4} \quad \text{Chemical Formula 4}$$

In Chemical Formula 4, $0.9 \le a4 \le 1.8$, $0.8 \le x4 < 1$, $0 < y4 \le 0.2$, $0 \le z4 \le 0.2$, $0.9 \le x4+y4+z4 \le 0.1$, $0 \le b4 \le 0.1$, $M^6$ may be at least one element selected from Al, B, Ba, Ca, Ce, Cr, Cu, Fe, Mg, Mo, Nb, Si, Sr, Ti, V, W, and Zr, and X may be at least one element selected from F, P, and S.

In the positive active material according to an embodiment, the first positive active material may be included in an amount of about 50 wt % to about 90 wt %, and the second positive active material may be included in an amount of about 10 wt % to about 50 wt % based on the total amount of the first positive active material and the second positive active material. The first positive active material may be, for example, included in an amount of about 60 wt % to about 90 wt %, or about 70 wt % to about 90 wt % and the second positive active material may be, for example, included in an amount of about 10 wt % to about 40 wt %, or about 10 wt % to about 30 wt %. When the content ratio (e.g., amount ratio) of the first positive active material and the second positive active material is as described above, the positive active material including the same may realize high capacity, improve a mixture density, and exhibit high energy density.

Method of Preparing Positive Active Material

In an embodiment, a method for preparing a positive active material for a rechargeable lithium battery includes performing a first process of adding a second lithium nickel-based composite oxide in a form of a single particle and a cobalt raw material to a solvent, sequentially performing a second process of adding a first lithium nickel-based composite oxide in a form of a secondary particle in which a plurality of primary particles are aggregated and a cobalt raw material, and obtaining a first positive active material having a cobalt coating portion on the surface of the secondary particle and a second positive active material having a cobalt coating portion on the surface of the single particle. Herein, a ratio of the time (minutes) required for the first process to the time (minutes) required for the second process is about 65:35 to about 75:25. According to this method, the coating of the secondary particles is strengthened, while excessive coating of single particles is suppressed or reduced, for example, the coating contents (e.g., amounts) of two types (or kinds) of particles are suitably or appropriately adjusted, resulting in improving performance of a rechargeable lithium battery such as high-temperature long-term cycle-life characteristics, initial charge/discharge efficiency, high-temperature storage performance, and the like. For example, according to the preparing method, as described above, prepared is a positive active material satisfying that the cobalt content (e.g., amount, at %) based on the total amount of nickel and cobalt in the cobalt coated portion of the first positive active material is about 1.45 to about 1.60 times the cobalt content (e.g., amount, at %) based on the total amount of nickel and cobalt in the cobalt coating portion of the second positive active material, and the aforementioned positive active material may be obtained.

In some embodiments, after putting the solvent into the mixer, the single particle-type second lithium nickel-based composite oxide and the cobalt raw material are added thereto and then, mixed therewith to perform a first process. The first process proceeds for a set or predetermined time to obtain a first mixture, and then, the secondary particle-type first lithium nickel-based composite oxide and the cobalt raw material are added to the first mixture and then, mixed together to sequentially perform a second process. In other words, the single particles and the secondary particles are not simultaneously coated, while washed, but after first performing the first process of coating the single particles, while washing, the second process sequentially proceeds to lead uniform (e.g., substantially uniform) coating on two types (or kinds) of the particles.

Herein, a time ratio utilized or required for the first process and the second process should be suitably or appropriately controlled to resolve non-uniform coating between single particles and secondary particles and suppress resistance or reduce and thereby gas generation, resulting in improving long-term cycle-life characteristics, initial charge/discharge efficiency, and the like. When a ratio of a time (min) of the first process to a total time (min) of the first process and the second process is smaller than about 0.65, a coating amount on the single particle-type second positive active material surface is excessively reduced, resulting in deterioration or reduction of structural stability of the second positive active material and ultimately, deterioration or reduction of long-term cycle-life characteristics. In addition, when the ratio of the time (min) of the first process to the total time (min) of the first process and the second process is larger than about 0.75, the coating amount on the second positive active material may be excessively increased, resulting in increased sheet resistance and ultimately deterioration or reduction of cycle-life.

In the first process, after first adding the cobalt raw material, the second lithium nickel-based composite oxide may be sequentially added, and in the second process, after first adding the cobalt raw material, the first lithium nickel-based composite oxide may be sequentially added.

The first lithium nickel-based composite oxide and the second lithium nickel-based composite oxide may be a compound represented by Chemical Formula 1, for example, a compound represented by Chemical Formula 2, Chemical Formula 3, or Chemical Formula 4.

The cobalt raw material may be, for example, cobalt hydroxide, cobalt carbonate, cobalt sulfate, cobalt oxide, and/or cobalt nitrate.

In the first process, the cobalt raw material may be added so that the cobalt content (e.g., amount) based on the total amount of elements except lithium and oxygen in the second lithium-nickel composite oxide may be about 0.01 parts by mole to about 7 parts by mole, for example, about 0.01 parts by mole to about 5 parts by mole, or about 0.1 parts by mole to about 3 parts by mole. In this case, a cobalt coating portion having a suitable or appropriate amount of cobalt may be formed.

In the second process, the cobalt raw material may be added so that the cobalt content (e.g., amount) based on the total amount of elements except lithium and oxygen in the first lithium-nickel composite oxide may be about 0.01 parts by mole to about 7 parts by mole, for example, about 0.01 parts by mole to about 5 parts by mole, or about 0.1 parts by mole to about 3 parts by mole. In this case, a cobalt coating portion having a suitable or appropriate amount of cobalt may be formed.

In the second process, when the first lithium nickel-based composite oxide is added, the first lithium nickel-based composite oxide together with the second lithium nickel-based composite oxide is added in a weight ratio of about 9:1 to 5:5, for example, about 8:2 to 6:4. When mixed together in these mixing ratios, energy density may be maximized or increased.

In the first process and the second process, a precipitating agent, a pH adjusting agent, and/or the like may be further added as needed.

The method of preparing the positive active material according to an embodiment may further include filtering a second mixture obtained from the second process for a set or predetermined time to remove the solvent and drying it. At this time, drying may proceed for about 5 hours to about 15 hours at a temperature range of about 100° C. to about 300° C. In addition, the product obtained by drying may be subjected to heat treatment. The heat treatment may be performed in an oxidizing gas atmosphere such as oxygen or air atmosphere, and may be performed at about 650° C. to about 900° C., or about 650° C. to about 800° C. The heat treatment may be performed during a variable amount of time depending on a heat-treatment temperature and/or the like, for example, for about 5 hours to about 30 hours or about 10 hours to about 24 hours.

During the heat treatment of the obtained product, a lithium raw material may be further added. The lithium raw material may be, for example, $Li_2CO_3$, LiOH, a hydrate thereof, or a combination thereof. The lithium raw material may be added so that a lithium content (e.g., amount) based on a total amount of elements other than lithium and oxygen in the first lithium nickel-based composite oxide and the second lithium nickel-based composite oxide may be about 0.1 parts by mole to about 10 parts by mole, for example, about 0.1 parts by mole to about 8 parts by mole, or about 1 part by mole to about 6 parts by mole. In the aforementioned washing process in the solvent, the lithium nickel-based composite oxide particles may be damaged on the surface which may deteriorate or reduce capacity and rate capability and also increases resistance during high-temperature storage, but the lithium raw material may be added during the heat treatment in this way to restore the surface damage and improve capacity, rate capability, and the like.

Positive Electrode

The positive electrode for a rechargeable lithium battery may include a current collector and a positive active material layer on the current collector. The positive active material layer may include a positive active material, and may further include a binder and/or a conductive material (e.g., an electrically conductive material).

The binder improves binding properties of positive active material particles with one another and with a current collector. Examples thereof may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The content (e.g., amount) of the binder in the positive active material layer may be about 1 wt % to about 5 wt % based on the total weight of the positive active material layer.

The conductive material is included to provide electrode conductivity (e.g., electrical conductivity) and any suitable electrically conductive material may be used as a conductive material unless it causes an undesirable chemical change in the rechargeable lithium battery. Examples of the conductive material may include a carbon-based material such as natural graphite, artificial graphite, carbon black, acetylene black, ketjen black, a carbon fiber, a carbon nanofiber, a carbon nanotube, and the like; a metal-based material of a metal powder or a metal fiber including copper, nickel, aluminum, silver, and the like; a conductive polymer such as a polyphenylene derivative; or a mixture thereof.

The content (e.g., amount) of the conductive material in the positive active material layer may be about 1 wt % to about 5 wt % based on the total weight of the positive active material layer.

An aluminum foil may be used as the positive electrode current collector, but is not limited thereto.

Negative Electrode

A negative electrode for a rechargeable lithium battery includes a current collector and a negative active material layer on the current collector. The negative active material layer may include a negative active material, and may further include a binder and/or a conductive material (e.g., an electrically conductive material).

The negative active material may include a material that reversibly intercalates/deintercalates lithium ions, a lithium metal, a lithium metal alloy, a material capable of doping/dedoping lithium, and/or a transition metal oxide.

The material that reversibly intercalates/deintercalates lithium ions may include, for example crystalline carbon, amorphous carbon, or a combination thereof as a carbon-based negative active material. The crystalline carbon may be irregular-shaped, plate-like, flake-like, spherical, or fiber-shaped natural graphite and/or artificial graphite. The amorphous carbon may be a soft carbon, a hard carbon, a mesophase pitch carbonization product, calcined coke, and/or the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be a Si-based negative active material and/or a Sn-based negative active material. The Si-based negative active material may include silicon, a silicon-carbon composite, $SiO_x$ ($0<x<2$), and/or a Si-Q alloy (wherein Q is an alkali metal, an alkaline-earth metal, a Group 13 element, a Group 14 element, a Group 15 element, a Group 16 element, a transition metal, a rare earth element, and a combination thereof, but not Si) and the Sn-based negative active material may include Sn, $SnO_2$, an Sn—R alloy (wherein R is an alkali metal, an alkaline-earth metal, a Group 13 element, a Group 14 element, a Group 15 element, a Group 16 element, a transition metal, a rare earth element, and a combination thereof, but not Sn). At least one of these materials may be mixed together with $SiO_2$. The elements Q and R may be selected from Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The silicon-carbon composite may be, for example, a silicon-carbon composite including a core including crystalline carbon and silicon particles and an amorphous carbon coating layer disposed on the surface of the core. The crystalline carbon may be artificial graphite, natural graphite, or a combination thereof. The amorphous carbon precursor may be a coal-based pitch, mesophase pitch, petroleum-based pitch, coal-based oil, petroleum-based heavy oil, and/or a polymer resin such as a phenol resin, a furan resin, or a polyimide resin. In this case, the content (e.g., amount) of silicon may be about 10 wt % to about 50 wt % based on the total weight of the silicon-carbon composite. In addition, the content (e.g., amount) of the crystalline carbon may be about 10 wt % to about 70 wt % based on the total weight of the silicon-carbon composite, and the content (e.g., amount) of the amorphous carbon may be about 20 wt % to about 40 wt % based on the total weight of the silicon-carbon composite. In addition, a thickness of the amorphous carbon coating layer may be about 5 nm to about 100 nm. An average particle diameter (D50) of the silicon particles may be about 10 nm to about 20 μm. The average particle diameter (D50) of the silicon particles may be about 10 nm to about 200 nm. The silicon particles may exist in an oxidized form, and in this case, an atomic content ratio (e.g., an atomic ratio) of Si:O in the silicon particles indicating a degree of oxidation may be about 99:1 to about 33:67. The silicon particles may be $SiO_x$ particles, and in this case, the range of x in $SiO_x$ may be greater than about 0 and less than about 2. In the present specification, unless otherwise defined, an average particle diameter (D50) indicates the diameter of a particle where an accumulated volume is about 50 volume % in a particle distribution.

The Si-based negative active material and/or Sn-based negative active material may be mixed together with the carbon-based negative active material. When the Si-based negative active material and/or Sn-based negative active material and the carbon-based negative active material are mixed together and used, the mixing ratio may be a weight ratio of about 1:99 to about 90:10.

In the negative active material layer, the negative active material may be included in an amount of about 95 wt % to about 99 wt % based on the total weight of the negative active material layer.

In an embodiment, the negative active material layer further includes a binder, and may optionally further include a conductive material (e.g., an electrically conductive material). The content (e.g., amount) of the binder in the negative active material layer may be about 1 wt % to about 5 wt % based on the total weight of the negative active material layer. In addition, when the conductive material is further included, the negative active material layer may include about 90 wt % to about 98 wt % of the negative active material, about 1 wt % to about 5 wt % of the binder, and about 1 wt % to about 5 wt % of the conductive material.

The binder serves to well adhere the negative active material particles to each other and also to adhere the negative active material to the current collector. The binder may be a water-insoluble binder, a water-soluble binder, or a combination thereof.

Examples of the water-insoluble binder include polyvinyl chloride, carboxylated polyvinyl chloride, polyvinyl fluoride, an ethylene oxide-containing polymer, an ethylene propylene copolymer, polystyrene, polyvinylpyrrolidone, polyurethane, polytetrafluoroethylene, polyvinylidene fluoride, polyethylene, polypropylene, polyamideimide, polyimide, or a combination thereof.

The water-soluble binder may include a rubber binder and/or a polymer resin binder. The rubber binder may be selected from a styrene-butadiene rubber, an acrylated styrene-butadiene rubber, an acrylonitrile-butadiene rubber, an acrylic rubber, a butyl rubber, a fluororubber, and a combination thereof. The polymer resin binder may be selected from polyethylene oxide, polyvinylpyrrolidone, polyepichlorohydrin, polyphosphazene, polyacrylonitrile, an ethylene propylene diene copolymer, polyvinylpyridine, chlorosulfonated polyethylene, latex, a polyester resin, an acrylic resin, a phenol resin, an epoxy resin, polyvinyl alcohol, and a combination thereof.

When a water-soluble binder is used as the negative electrode binder, a cellulose-based compound capable of imparting viscosity may be further included. As the cellulose-based compound, one or more of carboxymethyl cellulose, hydroxypropylmethyl cellulose, methyl cellulose, and/or alkali metal salts thereof may be mixed and used. The alkali metal may be Na, K, and/or Li. The amount of the thickener used may be about 0.1 parts by weight to about 3 parts by weight based on 100 parts by weight of the negative active material.

The conductive material is included to provide electrode conductivity (e.g., electrical conductivity) and any suitable electrically conductive material may be used as a conductive material unless it causes an undesirable chemical change in the rechargeable lithium battery. Examples of the conductive material include a carbon-based material such as natural graphite, artificial graphite, carbon black, acetylene black, ketjen black, a carbon fiber, carbon nanofiber, carbon nanotube, and the like; a metal-based material of a metal powder and/or a metal fiber including copper, nickel, aluminum silver, and the like; a conductive polymer such as a polyphenylene derivative; or a mixture thereof.

The negative electrode current collector may include one selected from a copper foil, a nickel foil, a stainless steel foil, a titanium foil, a nickel foam, a copper foam, a polymer substrate coated with a conductive metal, and a combination thereof.

Rechargeable Lithium Battery

Another embodiment provides a rechargeable lithium battery including a positive electrode, a negative electrode, a separator between the positive electrode and the negative electrode, and an electrolyte.

FIG. 1 is a schematic view illustrating a rechargeable lithium battery according to an embodiment. Referring to FIG. 1, a rechargeable lithium battery 100 according to an embodiment includes a battery cell including a positive electrode 114, a negative electrode 112 facing the positive electrode 114, a separator 113 between the positive electrode 114 and the negative electrode 112, and an electrolyte for a rechargeable lithium battery impregnating the positive electrode 114, negative electrode 112, and separator 113, a battery case 120 housing the battery cell, and a sealing member 140 sealing the battery case 120.

The electrolyte includes a non-aqueous organic solvent and a lithium salt.

The non-aqueous organic solvent serves as a medium for that transmit ions taking part in the electrochemical reaction of a battery. The non-aqueous organic solvent may be a carbonate-based, ester-based, ether-based, ketone-based, and/or alcohol-based solvent, and/or an aprotic solvent. Examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent include methyl acetate, ethyl acetate, n-propyl acetate, dimethyl acetate, methyl propionate, ethyl propionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and/or the like and the ketone-based solvent may be cyclohexanone, and/or the like. In addition, the alcohol-based solvent may be ethyl alcohol, isopropyl alcohol, etc. and the aprotic solvent may be nitriles such as R—CN (where R is a C2 to C20 linear, branched, or cyclic hydrocarbon group and may include a double bond, an aromatic ring, and/or an ether bond), amides such as dimethylformamide, dioxolanes such as 1,3-dioxolane, sulfolanes, and/or the like.

The non-aqueous organic solvent may be used alone or in a mixture. When the organic solvent is used in a mixture, the mixture ratio may be controlled in accordance with a suitable or desirable battery performance.

In addition, in the case of the carbonate-based solvent, a mixture of a cyclic carbonate and a chain carbonate may be used. In this case, when the cyclic carbonate and the chain carbonate are mixed together in a volume ratio of about 1:1 to about 1:9, the electrolyte solution may exhibit excellent performance.

The non-aqueous organic solvent may further include an aromatic hydrocarbon-based organic solvent in addition to the carbonate-based solvent. In this case, the carbonate-based solvent and the aromatic hydrocarbon-based organic solvent may be mixed in a volume ratio of about 1:1 to about 30:1.

The aromatic hydrocarbon-based solvent may be an aromatic hydrocarbon-based compound represented by Chemical Formula I.

Chemical Formula I

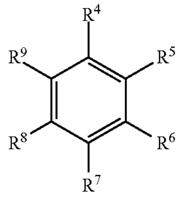

In Chemical Formula I, $R^4$ to $R^9$ are the same or different and are selected from hydrogen, a halogen, a C1 to C10 alkyl group, a C1 to C10 haloalkyl group, and a combination thereof.

Examples of the aromatic hydrocarbon-based solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte solution may further include vinylene carbonate or an ethylene carbonate-based compound represented by Chemical Formula II in order to improve cycle-life of a battery.

Chemical Formula II

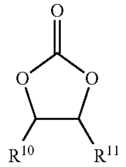

In Chemical Formula II, $R^{10}$ and $R^{11}$ are the same or different and selected from hydrogen, a halogen, a cyano group, a nitro group, and fluorinated C1 to C5 alkyl group, provided that at least one of $R^{10}$ and $R^{11}$ is a halogen, a cyano group, a nitro group, and fluorinated C1 to C5 alkyl group, and $R^{10}$ and $R^{11}$ are not simultaneously hydrogen.

Examples of the ethylene carbonate-based compound may be difluoroethylene carbonate, chloroethylene carbonate, dichloroethylene carbonate, bromoethylene carbonate, dibromoethylene carbonate, nitroethylene carbonate, cyanoethylene carbonate, and/or fluoroethylene carbonate. The amount of the additive for improving cycle-life may be used within a suitable or appropriate range.

The lithium salt dissolved in the non-aqueous organic solvent supplies lithium ions in a battery, enables a basic operation of a rechargeable lithium battery, and improves transportation of the lithium ions between positive and negative electrodes.

Examples of the lithium salt include at least one selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide; LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$, wherein x and y are natural numbers, for example, an integer in a range from 1 to 20, lithium difluoro(bisoxalato) phosphate, LiCl, LiI, $LiB(C_2O_4)_2$ (lithium bis(oxalato) borate; LiBOB), and lithium difluoro(oxalato)borate (LiDFOB).

The lithium salt may be used in a concentration in a range from about 0.1 M to about 2.0 M. When the lithium salt is included at the above concentration range, an electrolyte may have excellent performance and lithium ion mobility due to suitable or optimal electrolyte conductivity and viscosity.

The separator 113 separates a positive electrode 114 and a negative electrode 112 and provides a transporting passage for lithium ions and may be any suitable generally-used separator in a lithium ion battery. In other words, it may have low resistance to ion transport and excellent impregnation for an electrolyte solution. For example, the separator 113 may include a glass fiber, polyester, polyethylene, polypropylene, polytetrafluoroethylene, or a combination thereof and may have a form of a non-woven fabric and/or a woven fabric. For example, in a lithium ion battery, a polyolefin-based polymer separator such as polyethylene and polypropylene is mainly used. In order to ensure the heat resistance or mechanical strength, a coated separator including a ceramic component and/or a polymer material may be used. Optionally, the separator may have a mono-layered or multi-layered structure.

Rechargeable lithium batteries may be classified as lithium ion batteries, lithium ion polymer batteries, and lithium polymer batteries according to the presence of a separator and the type (or kind) of electrolyte used therein. The rechargeable lithium batteries may have a variety of suitable shapes and sizes, and include cylindrical, prismatic, coin, or pouch-type batteries, and may be thin film batteries or may be rather bulky in size. Structures and manufacturing methods for these batteries pertaining to this disclosure may be any suitable ones generally used in the art.

The rechargeable lithium battery according to an embodiment may be used in an electric vehicle (EV), a hybrid electric vehicle such as a plug-in hybrid electric vehicle (PHEV), and portable electronic device because it implements a high capacity and has excellent storage stability, cycle-life characteristics, and high rate characteristics at high temperatures.

Hereinafter, examples of the present invention and comparative examples are described. However, the examples are for the purpose of illustration and are not to be construed as limiting the present invention.

Example 1

1. Preparation of First Lithium Nickel-Based Composite Oxide in a Form of Secondary Particle Nickel sulfate ($NiSO_4{\cdot}6H_2O$), cobalt sulfate ($CoSO_4{\cdot}7H_2O$), and manganese sulfate ($MnSO_4{\cdot}H_2O$) as metal raw materials in a mole ratio of 95:4:1 are dissolved in distilled water as a solvent to prepare a metal raw material mixed solution, and in order to form a complex compound, ammonia water ($NH_4OH$) and sodium hydroxide (NaOH) as a precipitant are prepared.

After adding an ammonia water dilution solution to a continuous reactor, the metal raw material mixed solution is added thereto, and the sodium hydroxide is added thereto to maintain pH inside the reactor. When a reaction slowly proceeds for about 80 hours and is stabilized, a product overflowing therefrom is collected, washed, and dried, thereby obtaining a final precursor. Accordingly, a first nickel-based hydroxide ($Ni_{0.95}Co_{0.04}Mn_{0.01}(OH)_2$), in which primary particles are aggregated into secondary particles, is obtained.

The first nickel-based hydroxide is mixed together with LiOH, so that a content (e.g., amount) of lithium to a total metal content (e.g., amount) of the first nickel-based hydroxide may have a mole ratio of 1.0, and then, primarily heat-treated under an oxygen atmosphere at about 750° C. for 15 hours, thereby obtaining a first nickel-based oxide ($LiNi_{0.95}Co_{0.04}Mn_{0.01}O_2$). The obtained first nickel-based oxide has an average particle diameter of about 15 μm and includes the secondary particles in which the primary particles are aggregated.

2. Preparation of Second Lithium Nickel-Based Composite Oxide in a Form of Single Particle Nickel sulfate, cobalt sulfate, and manganese sulfate are dissolved in distilled water as a solvent in a mole ratio of 95:4:1 to prepare a raw metal material mixed solution. In order to form a complex, an ammonia water ($NH_4OH$) diluent and sodium hydroxide (NaOH) as a precipitant are prepared. Subsequently, the raw metal material mixed solution, the ammonia water, and the sodium hydroxide are each put into a reactor. While stirred, a reaction proceeds for about 20 hours. Subsequently, the slurry solution in the reactor is filtered, washed with distilled water with high purity, and dried for 24 hours, thereby obtaining a second nickel-based hydroxide ($Ni_{0.95}Co_{0.04}Mn_{0.01}(OH)_2$) powder. The obtained second nickel-based hydroxide powder has an average particle diameter of about 4.0 μm and a specific surface area of about 15 $m^2/g$, which is measured utilizing a BET method.

The obtained second nickel-based hydroxide, LiOH satisfying Li/(Ni+Co+Mn)=1.05, and 1 part by mole of Al, 0.2 parts by mole of Zr, and 0.1 parts by mole of Mg components as a dopant based on 100 parts by mole of the total metal of the second nickel-based hydroxide are mixed together and then, put in a firing furnace and secondarily heat treated under an oxygen atmosphere at 820° C. for 10 hours. Subsequently, a product obtained therefrom is pulverized for about 30 minutes and then, separated/dispersed into a plurality of second lithium nickel-based oxides having a form of a single particle. The obtained second I nickel-based oxide having a form of a single particle has an average particle diameter of about 3.7 μm.

3. Preparation of Cobalt Coating and Final Positive Active Material

A distilled water solvent and cobalt sulfate are put in a mixer, and the prepared second lithium nickel-based composite oxide is added thereto and then, mixed together, which is a first process. The cobalt sulfate is added to have 2.5 parts by mole of cobalt content based on the total amount of all the elements excluding lithium and oxygen in the second lithium nickel-based composite oxide. In the first process, after adding the second lithium nickel-based composite oxide, the precipitant and the sodium hydroxide as a pH-controlling agent are added thereto and mixed together.

After performing the first process for 70 minutes, a second process of adding the first lithium nickel-based composite oxide thereto after adding cobalt sulfate thereto and then, mixing them together is carried out. The first lithium nickel-based composite oxide is added to have a weight ratio of 7:3 with the previously introduced second lithium nickel-based composite oxide. The cobalt sulfate is added to have 2.5 parts by mole of a cobalt content (e.g., amount) based on the total amount of all the elements excluding lithium and oxygen in the first lithium nickel-based composite oxide. In the second process, after adding the first lithium nickel-based composite oxide, the sodium hydroxide is also added thereto and mixed together.

After performing the second process for 30 minutes, a product therefrom is filtered and dried at 200° C. for 10 hours. Subsequently, the obtained product is mixed together with a lithium raw material and then, put in a firing furnace and heat-treated under an oxygen atmosphere at about 710° C. for 15 hours. Herein, the lithium law material is added to have 5 parts by mole of an amount of a lithium content (e.g., amount) based on the total amount of all elements excluding lithium and oxygen in the obtained product. Thereafter, after cooling the firing furnace to room temperature, and obtained is a final positive active material in which a first positive active material in which a cobalt coating portion is formed on the surface of the first lithium nickel-based composite oxide in the form of secondary particles and a second positive active material in which the cobalt coating portion is formed on the surface of the second lithium nickel-based composite oxide in the form of a single particle are mixed together.

4. Manufacture of Positive Electrode 95 wt % of the final positive active material, 3 wt % of a polyvinylidene fluoride binder, and 2 wt % of carbon nanotube conductive material are mixed together in an N-methylpyrrolidone solvent to prepare a positive active material slurry. The positive active material slurry is coated on an aluminum current collector, dried, and then compressed to manufacture a positive electrode.

5. Manufacture of Rechargeable Lithium Battery Cell

A coin half-cell is manufactured by providing a separator having a polyethylene polypropylene multilayer structure between the manufactured positive electrode and a lithium metal counter electrode, and injecting an electrolyte solution in which 1.0 M $LiPF_6$ lithium salt was added to a solvent in which ethylene carbonate and diethyl carbonate are mixed together in a volume ratio of 50:50.

Comparative Example 1

In "3. Cobalt coating and Preparation of Final Positive Active Material" of Example 1, the first process and the second process are not separately performed, but the coating is simultaneously performed. In other words, the first lithium nickel-based composite oxide and the second lithium nickel-based composite oxide together with the cobalt raw material are added to a solvent and then, mixed together for 100 minutes, filtered, and dried, thereby obtaining a final positive active material. Herein, the cobalt raw material is added to have a cobalt content (e.g., amount) of 2.5 parts by mole relative to a total content (e.g., amount) of all elements excluding lithium and oxygen in the first lithium nickel-based composite oxide and the second lithium nickel-based composite oxide.

Otherwise, a positive active material, a positive electrode, and a rechargeable lithium battery cell are manufactured in the same manner as in Example 1.

Comparative Example 2

A positive active material, a positive electrode, and a rechargeable lithium battery cell are manufactured in the same manner as in Example 1 except that the first process proceeds for 80 minutes, and the second process proceeds for 20 minutes in "3. Cobalt coating and Preparation of Final Positive Active Material" of Example 1.

Comparative Example 3

A positive active material, a positive electrode, and a rechargeable lithium battery cell are manufactured in the same manner as in Example 1 except that the first process proceeds for 60 minutes, and the second process proceeds for 40 minutes in "3. Cobalt coating and Preparation of Final Positive Active Material" of Example 1.

Evaluation Example 1: Analysis of Surface of Positive Active Material

Figure 2:
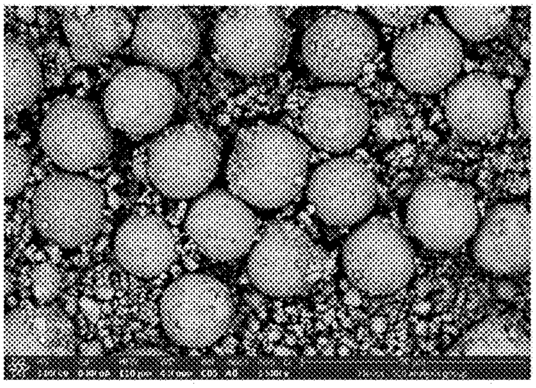
FIG. 2 is a scanning electron microscopy (SEM) image of a final positive active material prepared in Comparative Example 1.
Figure 3:
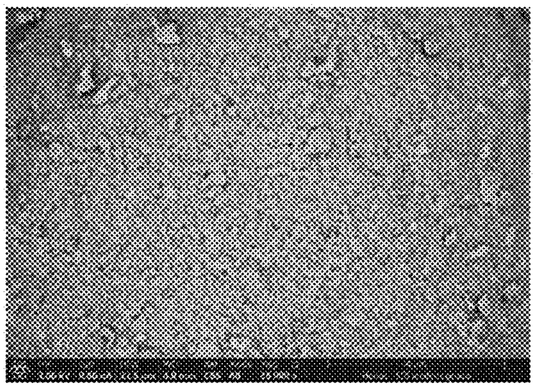
FIG. 3 is an SEM image of a surface of a first positive active material in a form of a secondary particle among final positive active materials of Comparative Example 1.

FIG. 2 is a scanning electron microscopy (SEM) image of the final positive active material according to Comparative Example 1, and FIG. 3 is an SEM image of the surface of the first positive active material in the form of secondary particles in the final positive active material according to Comparative Example 1.

Figure 4:
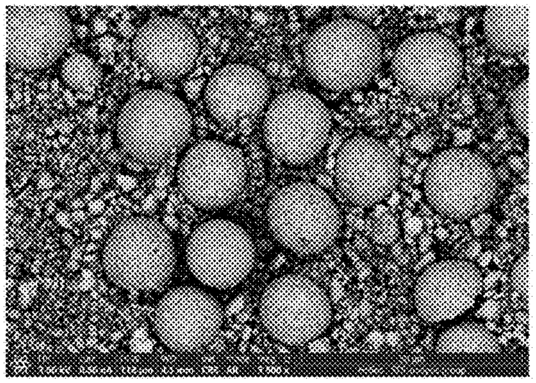
FIG. 4 is an SEM image of a final positive active material prepared in Example 1.
Figure 5:
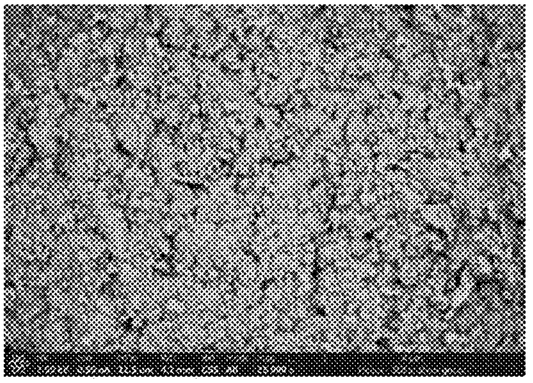
FIG. 5 is an SEM image of a surface of a first positive active material in a form of a secondary particle among final positive active materials of Example 1.

FIG. 4 is an SEM image of the final positive active material prepared in Example 1 and FIG. 5 is an SEM image of the surface of the first positive active material in a form of a secondary particle among the final positive active materials of Example 1.

Comparing FIGS. 2 and 3 of Comparative Example 1 with FIGS. 4 and 5 of Example 1, Example 1 exhibits more even (e.g., uniform) and thinner coating on the surface of the first positive active material.

Evaluation Example 2: Analysis of Fracture Surface of Positive Active Material

Figure 6:
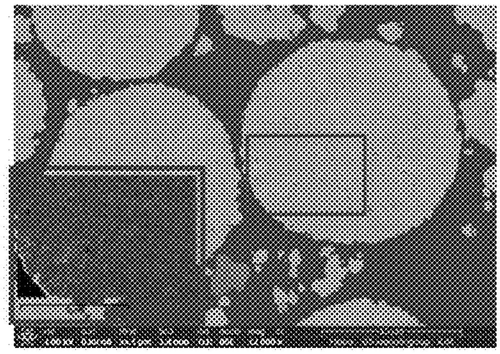
FIG. 6 is an SEM image of a fracture surface of the first positive active material of Comparative Example 1, and the lower left of FIG. 6 is an image in which cobalt elements are highlighted by scanning electron microscopy electron dispersive X-ray spectroscopy (SEM-EDS) analysis of a portion indicated by a rectangle.
Figure 7:
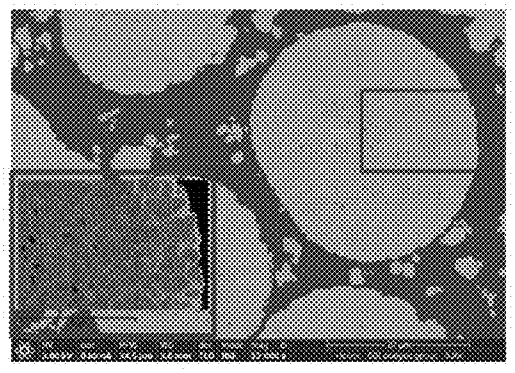
FIG. 7 is an SEM image of a fracture surface of the first positive active material of Example 1, and the lower left of FIG. 7 is an image in which cobalt elements are highlighted by SEM-EDS analysis of a portion indicated by a rectangle.

FIG. 6 is an SEM image of a fracture surface of the first positive active material of Comparative Example 1, and the lower left of FIG. 6 is an image in which cobalt elements are highlighted by scanning electron microscopy electron dispersive X-ray spectroscopy (SEM-EDS) analysis of a portion indicated by a rectangle. FIG. 7 is an SEM image of a fracture surface of the first positive active material of Example 1, and the lower left of FIG. 7 is an image in which cobalt elements are highlighted by SEM-EDS analysis of a portion indicated by a rectangle.

Comparing FIG. 6 with FIG. 7, Comparative Example 1 exhibits that the coating material is coated to be thicker only on the surface of the first positive active material secondary particle, and Example 1 exhibits cobalt coating on the boundary, the surface of the primary particles inside the secondary particle, as well as the surface of the first positive active material secondary particle.

Figure 8:
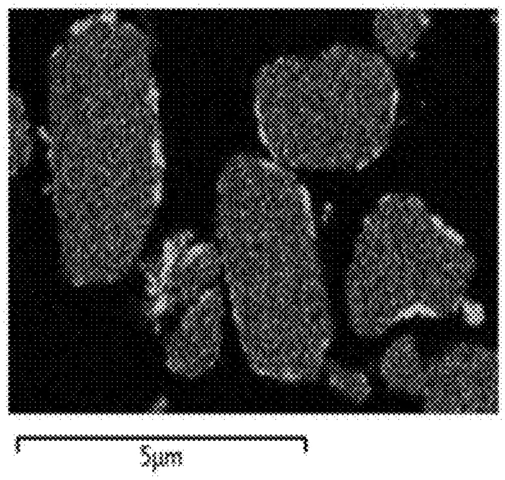
FIG. 8 is an image in which cobalt elements are highlighted by SEM-EDS analysis of the fracture surface of a second positive active material of Comparative Example 1.
Figure 9:
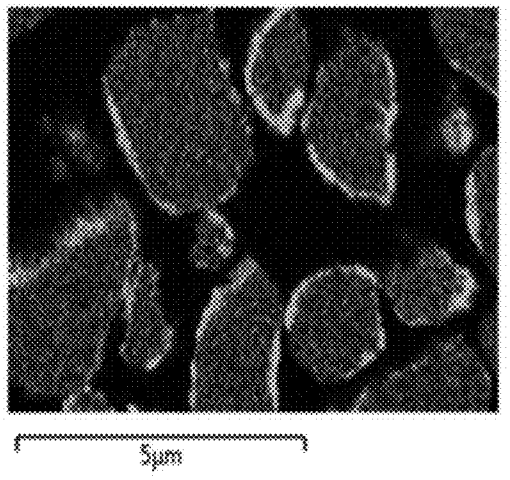
FIG. 9 is an image in which cobalt elements are highlighted by SEM-EDS analysis of a fracture surface of a second positive active material of Example 1.

FIG. 8 is an SEM image in which cobalt elements are highlighted by SEM-EDS analysis of the fracture surface of the second positive active material of Comparative Example 1 and FIG. 9 is an SEM image in which cobalt elements are highlighted by SEM-EDS analysis of the fracture surface of the second positive active material of Example 1.

Comparing FIG. 8 with FIG. 9, compared with Comparative Example 1, Example 1 exhibits more uniform and even cobalt coating on the surface of the second positive active material single particle.

Evaluation Example 3: Analysis of Cobalt Coating Content of Positive Active Material Each cobalt content (Co/(Ni+Co), e.g., amount, at %) on the surfaces of the first positive active material and the second positive active material is measured through the SEM-EDS analysis performed as described with respect to Evaluation Example 2, and the results are shown in Table 1. The data of Table 1 are obtained by equally correcting a total cobalt coating content (e.g., cobalt coating amount) of the first positive active material and the second positive active material by that of Example 1 in order to remove noise.

TABLE 1

| | First process (min) | Second process (min) | Coating content of second positive active material (B) | Coating content of first positive active material (A) | A/B |
|---|---|---|---|---|---|
| Ex. 1 | 70 | 30 | 40.4 | 61.8 | 1.53 |
| Comp. Ex. 1 | 100 | | 38.1 | 64.0 | 1.68 |
| Comp. Ex. 2 | 80 | 20 | 42.8 | 60.8 | 1.42 |
| Comp. Ex. 3 | 60 | 40 | 38.6 | 63.1 | 1.63 |

Evaluation Example 4: Evaluation of High-Temperature Cycle-life Characteristics of Battery Cells The rechargeable lithium battery cells according to Example 1 and Comparative Examples 1 to 3 are initially charged under conditions of constant current (0.2 C) and constant voltage (4.25 V, 0.05 C cut-off), paused for 10 minutes, and discharged to 3.0 V under a condition of constant current (0.2 C) to measure initial charge and discharge. Subsequently, the cells are 150 times repeatedly charged and discharged at 0.5 C/0.5 C at 45° C. A ratio of discharge capacity at each cycle to the initial discharge capacity is evaluated as capacity retention, that is, high-temperature cycle-life characteristics, and the results are shown in FIG. 10.

Figure 10:
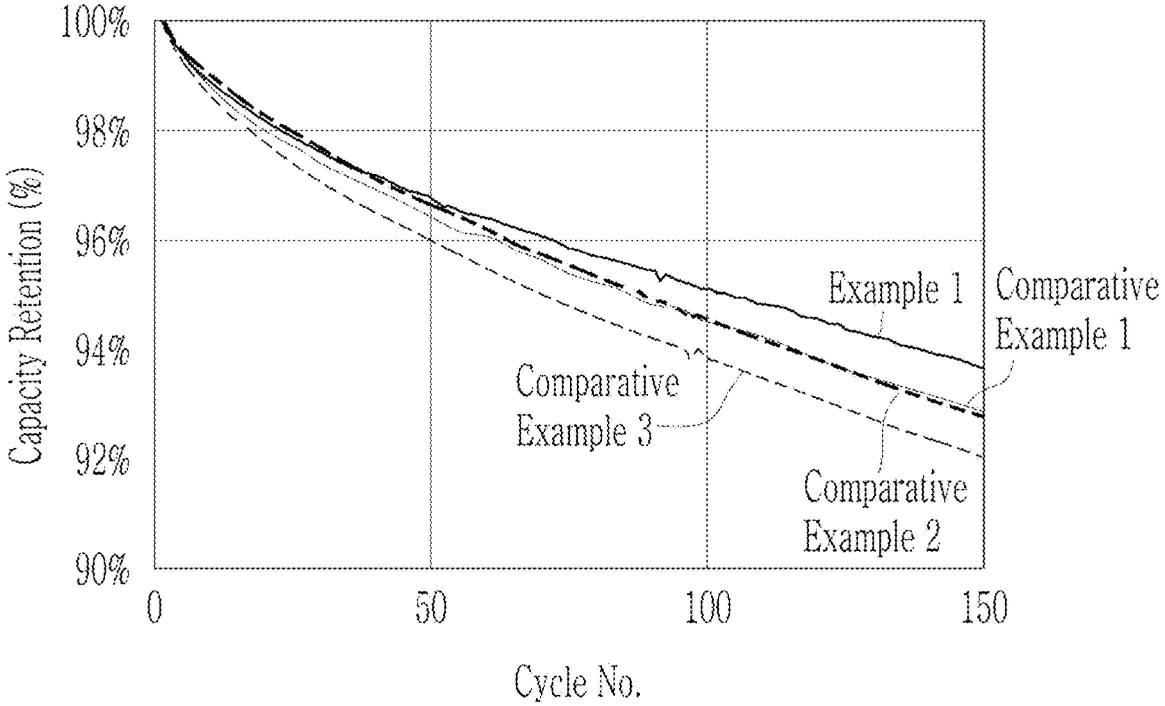
FIG. 10 is a graph showing high-temperature cycle-life characteristics of rechargeable lithium battery cells of Example 1 and Comparative Examples 1 to 3.

Referring to Table 1 and FIG. 10, Comparative Example 1, in which simultaneous coating is performed, exhibits excessive cobalt coating on the surface of the first positive active material having a high surface area and deteriorated high-temperature cycle-life characteristics, compared with Example 1, as shown in FIG. 10. The reason is believed to be that non-uniform coating between the first positive active material and the second positive active material accelerates degradation of the first positive active material during a long cycle-life, resulting in deteriorating performance.

Comparative Example 2, in which the first process and the second process sequentially proceed in a higher time ratio of the first process to a total process time, exhibits that excessive coating proceeds on the second positive active material surface, which rather works as resistance (e.g., increases electrical resistance), while the first positive active material surface lacks coating and has a higher side reaction, resulting in deteriorating long-term cycle-life characteristics.

Comparative Example 3, in which the first process and the second process sequentially proceed, exhibits a lower time ratio of the first process to a total process time and results in decreasing the coating content (e.g., amount) of the second positive active material surface, deteriorating surface stabilization effects and thus long-term cycle-life characteristics.

On the contrary, Example 1 resolves the non-uniform coating of the first positive active material and the second positive active material to reduce resistance due to the coating and thereby maximize or increase the surface stabilization effects and resultantly, improves long-term cycle-life characteristics at high temperatures.

While the subject matter of this disclosure has been described in connection with what is presently considered to be practical example embodiments, it is to be understood that the present disclosure is not limited to the disclosed embodiments. On the contrary, it is intended to cover various modifications and equivalent arrangements included within the spirit and scope of the appended claims, and equivalents thereof.

| Description of Symbols |
|---|
| 100: rechargeable lithium battery |
| 112: negative electrode |
| 113: separator |
| 114: positive electrode |
| 120: battery case |
| 140: sealing member |

What is claimed is:

1. A positive active material for a rechargeable lithium battery, comprising:

a first positive active material comprising a lithium nickel-based composite oxide and comprising a secondary particle in which a plurality of primary particles are aggregated and a cobalt coating portion on a surface of the secondary particle, and a second positive active material comprising a lithium nickel-based composite oxide and comprising a single particle and a cobalt coating portion on a surface of the single particle, wherein a cobalt content (at %) based on the total amount of nickel and cobalt in the cobalt coating portion of the first positive active material is about 1.45 times to about 1.60 times a cobalt content (at %) based on the total amount of nickel and cobalt in the cobalt coating portion of the second positive active material.

2. The positive active material of claim 1, wherein:

the cobalt content based on the total amount of nickel and cobalt in the cobalt coating portion of the second positive active material is about 39 at % to about 45 at %.

3. The positive active material of claim 1, wherein:

the cobalt content based on the total amount of nickel and cobalt in the cobalt coating portion of the first positive active material is about 61 at % to about 63 at %.

4. The positive active material of claim 1, wherein:

the first positive active material further comprises a grain boundary cobalt coating portion on the surface of the primary particles inside the secondary particle.

5. The positive active material of claim 1, wherein:

an average particle diameter of the first positive active material is about 5 μm to about 25 μm, and an average particle diameter of the second positive active material is about 0.1 μm to about 10 μm.

6. The positive active material of claim 1, wherein:

the first positive active material is included in an amount of about 50 wt % to about 90 wt %, and the second positive active material is included in an amount of about 10 wt % to about 50 wt % based on the total amount of the first positive active material and the second positive active material.

7. The positive active material of claim 1, wherein:

the lithium nickel-based composite oxide of the first positive active material and the lithium nickel-based composite oxide of the second positive active material are each independently represented by Chemical Formula 1:

$$Li_{a1}Ni_{x1}M^1_{y1}M^2_{z1}O_{2-b1}X_{b1} \quad \text{Chemical Formula 1}$$

wherein, in Chemical Formula 1, $0.9 \le a1 \le 1.8$, $0.8 \le x1 \le 1$, $0 \le y1 \le 0.2$, $0 \le z1 \le 0.2$, $0.9 \le x1+y1+z1 \le 1.1$, $0 \le b1 \le 0.1$, $M^1$ and $M^2$ are each independently at least one element selected from Al, B, Ba, Ca, Ce, Co, Cr, Cu, Fe, Mg, Mn, Mo, Nb, Si, Sr, Ti, V, W, and Zr, and X is at least one element selected from F, P, and S.

8. A rechargeable lithium battery comprising a positive electrode comprising the positive active material according to any one of claim 1, a negative electrode, and an electrolyte.

* * * * *